UNITED STATES PATENT OFFICE.

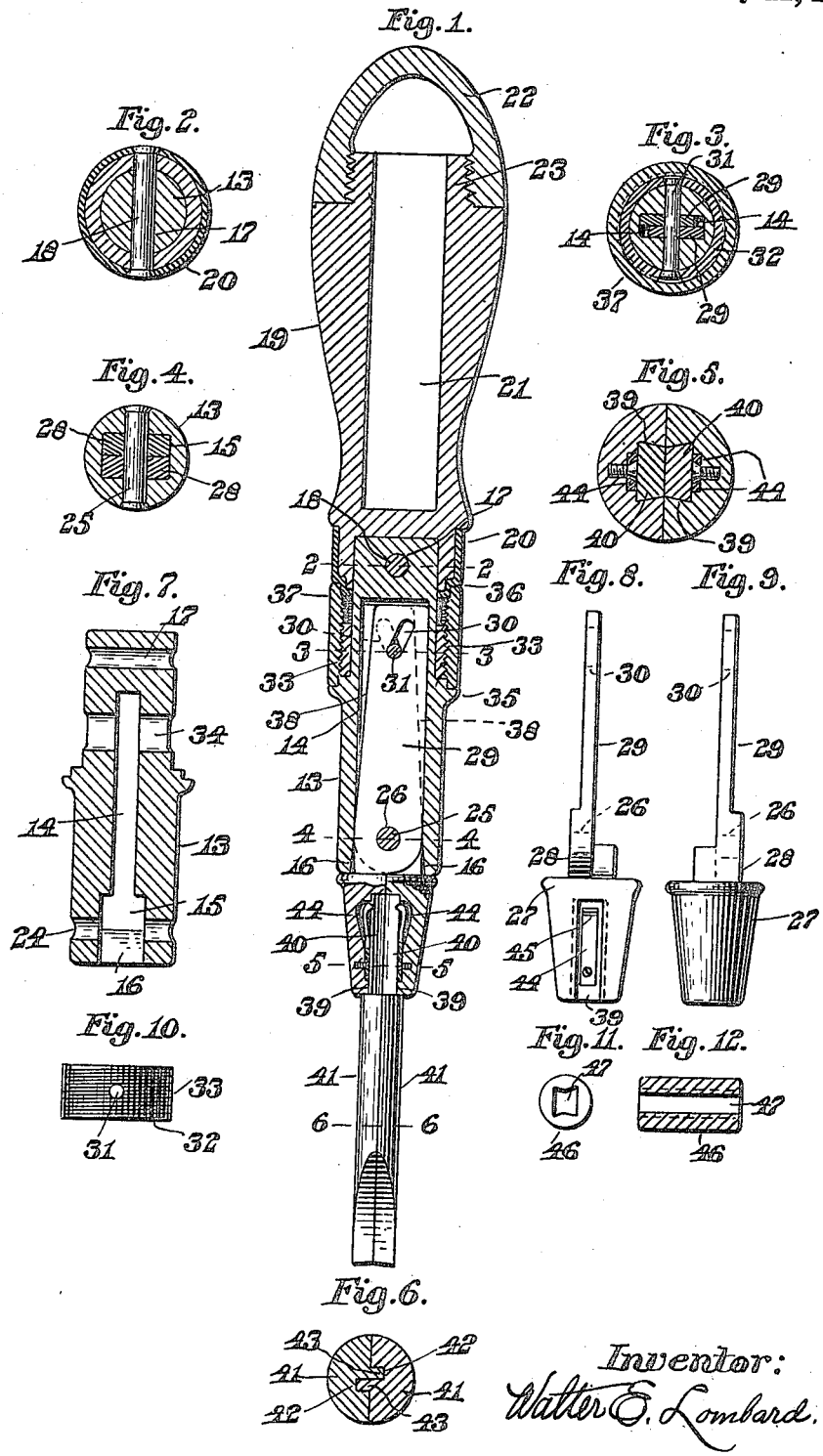

WALTER E. LOMBARD, OF ARLINGTON, MASSACHUSETTS.

SCREWDRIVER AND THE LIKE.

1,384,201.

Specification of Letters Patent.  Patented July 12, 1921.

Application filed July 1, 1920. Serial No. 393,464.

*To all whom it may concern:*

Be it known that I, WALTER E. LOMBARD, a citizen of the United States of America, and a resident of Arlington, in the county of Middlesex and State of Massachusetts, have invented certain new and useful Improvements in Screwdrivers and the like, of which the following is a specification.

This invention relates to screw drivers and the like and has for its principal object the provision of a device of this character adapted to be adjusted to fit various lengths of screw slots.

A further object of the invention is to provide a device in which the working tool is made in two parts adapted to be actuated by means mounted upon the handle to separate the working ends of said parts and thereby in the case of a screw driver, lengthen the portion to be inserted in a screw slot so that said portion will extend the entire length of said slot.

A further object of the invention is the provision of a device of this character in which the actuating jaws are pivoted to the handle and are adapted to receive and lock thereto, detachable working tools.

Another object of the invention is to provide a handle, having jaws pivoted thereto, with means for moving said jaws about their pivot and locking them in adjusted position.

Another object of the invention is the provision of means whereby the divided working tool may be separated laterally while interlocked to compel rotation together and resist all twisting strain.

The invention consists of two jaws pivoted to a body portion or shank of a handle the outer ends of said jaws being provided with interlocked parts of a working tool while the inner ends of said jaws are provided with means adapted to be engaged by a slidable member within and movable lengthwise of said handle by a rotatable nut restrained from end movement.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings—

Figure 1 represents a longitudinal section of a device embodying the principles of the present invention.

Fig. 2 represents a transverse section on line 2, 2, on Fig. 1.

Fig. 3 represents a transverse section on line 3, 3, on Fig. 1.

Fig. 4 represents a transverse section on line 4, 4, on Fig. 1.

Fig. 5 represents a transverse section on line 5, 5, on Fig. 1.

Fig. 6 represents a transverse section on line 6, 6, on Fig. 1.

Fig. 7 represents a longitudinal section of the body portion of said device.

Figs. 8 and 9 represent vertical elevations of the pivoted jaws.

Fig. 10 represents an elevation of the slidable jaw-actuating member, and

Figs. 11 and 12 represent respectively an end elevation and longitudinal section of a collar to protect the dovetailed ends of the working tools when not attached to the pivoted jaws.

Figs. 3 and 6 are drawn to an enlarged scale.

Similar characters indicate like parts throughout the several figures of the drawings.

In the drawings, 13 is a body portion or shank having a rectangular socket 14 extending from one end thereof, said socket at its outer end being preferably enlarged at 15 and provided with oppositely disposed inclined end walls 16 as shown in Figs. 1 and 7.

This body portion 13 is provided with a lateral cylindrical opening 17 to receive a pin 18 by which said shank or body portion may be secured to a handle 19.

This handle is provided with the usual metal ferrule 20 through which the opposite ends of the pin 18 preferably extend, said ends preferably being upset as shown in the drawings.

The handle 19 may be provided with a chamber 21 to receive additional working tools and when so provided it may have a closing cap 22 screwed to the threaded extension 23.

Obviously this cap 23, boss 22, and chamber 21 may be dispensed with and the handle made solid if desired and of any convenient shape.

The body portion or shank 13 is provided near its outer end with a transverse cylindrical opening 24 adapted to receive a pivot pin 25 which pin extends through openings 26 in the jaws 27.

The outer ends of the pivot pin 25 are preferably upset as indicated in Fig. 4 of the drawings.

The jaws 27 are alike and each is provided with an upwardly extending portion 28, these portions 28 of the two jaws fitting the rectangular enlarged socket 15.

Extending upwardly from the portions 28 are the plates 29 which, when abutting, fit the rectangular slot 14.

The upper ends of the plates 29 are provided with oppositely inclined slots 30 through which extends a pin 31 riveted to and movable with the slidable member 32.

The slidable member is provided with a peripheral thread 33 and is prevented from rotation by the pin 31 extending through the elongated slot 34 extending lengthwise of the body portion or shank 13.

The body portion or shank 13 is provided with a flange 35 between which and a shoulder 36 on the ferrule 20, is disposed a nut 37 the thread of which engages the thread 33 of the slidable member 32.

End movement of the nut 37 is prevented by the flange 35 and shoulder 36 and consequently when said nut is rotated, end movement will be imparted to the slidable member 32, thus causing the pin 31 to move upwardly in the slots 30 and 34 and cause the jaws 27 to be moved about the pivot 25.

To permit this movement about the pivot 25 each plate 29 is provided with one inclined edge 38 which is normally removed from the wall of the rectangular socket 14.

Each jaw 27 is provided with a dovetailed groove 39 in which is fitted the shank 40 of one part 41 of a working tool such, for instance, as a screw driver blade as shown in the drawings.

Each part 41 is provided on its inner face with a longitudinal groove 42 into which extends a rib 43 on the other part 41.

This interlocking of the two parts 41 prevents any twisting strain of the working tool when the same is being rotated while at the same time it permits the operating or working ends of the parts 41 being separated to a limited extent without the two parts being disengaged.

In each jaw 27 is a spring member 44 having a tooth 45 adapted to engage a recess in the shank 40 to prevent the accidental displacement of said part 41.

A plurality of different sizes of blades 41 may be provided for the same handle in order to accommodate the device to be used in connection with a great range of screw slots, the sets not in use being held together by the protector 46 having an opening 47 therein adapted to fit the two shanks 40 of the working tools 41.

By means of this device the two parts of a divided screw driver blade may be quickly adjusted to extend the entire length of a screw slot and locked in adjusted position.

Where in a home there are a limited number of screw drivers, it often happens that those on hand are either too large or too small. As the larger ones will not enter the slot of the screw, a smaller one is selected and if the working end thereof is considerably shorter than the screw slot, the screw is liable to be damaged to such an extent as to prevent its subsequent removal by means of any screw driver and if removed otherwise, the article in which it is positioned may be materially damaged.

By the use of the present invention these difficulties are wholly obviated.

It is believed that the operation and many advantages of the invention will be readily understood without further description.

Having thus described my invention, I claim—

1. In a device of the class described, an elongated handle adapted to be grasped and rotated about its axis by the hand of the operator; a divided tool movably mounted on one end of said handle and having flat end faces of equal thickness and in alinement; and means carried by said handle for moving the work-engaging end faces of the two parts of said tool toward and from each other in a plane substantially perpendicular to the axis of said handle.

2. In a device of the class described, an elongated handle adapted to be grasped and rotated about its axis by the hand of the operator; a screw-slot-engaging blade formed in two parts pivoted together and to said handle; and means on said handle for moving the operating ends of said blade parts to the outer end of a screw slot.

3. In a device of the class described, an elongated handle adapted to be grasped and rotated about its axis by the hand of the operator; a screw-slot-engaging blade formed in two parts pivoted together and to said handle; and a slidable member carried by said handle and coacting with both parts of said blade for moving the operating ends of said blade parts to the outer end of a screw slot.

4. In a device of the class described, an elongated handle adapted to be grasped and rotated about its axis by the hand of the operator; a screw-slot-engaging blade formed in two parts pivoted together and to said handle; and mechanism supported by said handle for moving the operating ends of said blade parts to the outer end of a screw slot and locking them in adjusted position.

5. In a device of the class described, an elongated handle adapted to be grasped and rotated about its axis by the hand of the operator; a screw-slot-engaging blade formed in two parts pivoted together and to said handle at a point intermediate their ends, with their inner ends within one end of said handle and provided with inclined slots and their outer work-engaging ends in alinement; a non-revoluble slidable member provided with a pin in said inclined slots; and means on said handle for moving said member endwise.

6. In a hand tool of the class described, a blade formed in two parts pivoted together intermediate their ends with the upper ends provided with inclined slots; a non-revoluble slidable member provided with a pin in said inclined slots and having peripheral threads; and a nut engaging the thread of said member and adapted in its rotation to reciprocate said member endwise.

7. In a hand tool of the class described, a blade formed in two parts pivoted together intermediate their ends with the upper ends provided with inclined slots; a non-revoluble slidable member provided with a pin in said inclined slots and having a peripheral thread; a nut engaging the thread of said member and adapted in its rotation to reciprocate said member endwise; and means preventing end movement of said nut.

8. In a hand-tool of the class described, a blade formed in two parts; interengaging means on the blade parts for preventing one part rotating relatively to the other part; and a handle including means for moving both blade parts and separating the operating ends thereof, whereby the work-engaging face of the blade is lengthened.

9. In a hand tool of the class described, a blade formed in two parts having alined operating ends, one of said parts having a longitudinal rib extending from its inner face and positioned in a slot formed in the adjacent face of the other part; and a handle including means for separating the operating ends of said blade parts whereby the work-engaging face of the blade is lengthened.

10. In a hand-tool of the class described, a handle; two members pivoted together and to said handle intermediate their ends; means confined within said handle and coacting with the inner ends of said members at points removed from their pivot whereby said members may be moved about their pivot; and working tool parts secured to the lower end of each member.

11. In a hand-tool of the class described, a handle; two members pivoted together and to said handle intermediate their ends; means movable lengthwise of said handle and coacting with the inner ends of said members at points removed from their pivot whereby said members may be moved about their pivot and locked in adjusted position; and working tool parts secured to the lower end of each member.

12. In a device of the class described, an elongated handle adapted to be grasped and rotated about its axis by the hand of the operator; two tool-supporting members pivoted together and to said handle intermediate their ends with their inner ends positioned within the handle and provided with inclined slots; and means mounted on and movable lengthwise of said handle engaging said slots and adapted to move said jaws about their pivot.

13. In a device of the class described, an elongated handle adapted to be grasped and rotated about its axis by the hand of the operator; two tool-supporting jaws pivoted together and to said handle by a fixed pivot; and a movable member on said handle adapted in its movement to move each jaw about its pivot.

14. In a device of the class described, an elongated handle adapted to be grasped and rotated about its axis by the hand of the operator; two tool-supporting jaws pivoted together and to said handle by a fixed pivot; and a movable member within said handle adapted in its movement to move each jaw about its pivot.

15. In a device of the class described, an elongated handle adapted to be grasped and rotated about its axis by the hand of the operator; two tool-supporting jaws pivoted together and to said handle by a fixed pivot; a movable member within said handle adapted in its movement to move each jaw about its pivot; and means surrounding said handle for locking said movable member in adjusted position.

16. In a hand tool of the class described, two pivoted tool-supporting jaws provided at their upper ends with oppositely inclined working faces; a handle; and a member positioned within and movable lengthwise of said handle and coacting with said inclined faces to move said jaws about their pivots.

17. In a hand tool of the class described, two pivoted tool-supporting jaws provided at their upper ends with oppositely inclined working faces; a handle; a member positioned within and movable lengthwise of said handle and coacting with said inclined faces to move said jaws about their pivots; and means for locking said movable member in adjusted position.

18. In a device of the class described, an elongated handle adapted to be grasped and rotated about its axis by the hand of the operator and having a shank provided with a socket extending inwardly from its outer end; two tool-supporting jaws the inner ends of which are positioned in said socket; a pin extending transversely of said socket and forming a pivot common to both jaws; and means mounted on said handle for moving said jaws about said pivot.

19. In a device of the class described, an elongated handle adapted to be grasped and rotated about its axis by the hand of the operator and having a shank provided with a socket extending inwardly from its outer end; two tool-supporting jaws the inner ends of which are positioned in said socket; a pin extending transversely of said socket and forming a pivot common to both jaws; and means mounted on said handle for moving said jaws about said pivot and locking them in adjusted position.

20. In a hand tool of the class described, a handle; two tool-supporting jaws partially within and pivoted to said handle with their inner ends provided with oppositely inclined slots; a member slidable lengthwise of said handle and coacting with said slots to move said jaws about their pivot; and a revoluble member on said handle surrounding said slidable member and adapted in its rotation to impart end movement thereto.

21. In a hand tool of the class described, a handle; two tool-supporting jaws partially within and pivoted to said handle with their inner ends provided with oppositely inclined slots; a member within and slidable lengthwise of said handle and coacting with said slots to move said jaws about their pivot; a revoluble member on said handle adapted in its rotation to impart end movement to said slidable member; and means preventing end movement of said revoluble member.

22. In a hand tool of the class described, a cylindrical member having a rectangular socket in one end and a longitudinal slot extending transversely of the inner end of said socket; two tool-supporting jaws partially disposed within said socket; a pin for pivoting both jaws to said member; a threaded collar on said member and slidable lengthwise thereof; a pin in said collar extending through said longitudinal slot and coacting with oppositely inclined surfaces on the inner ends of said jaws; a handle to which said member is secured; and a revoluble nut coacting with said collar and adapted in its rotation to impart end movement thereto.

23. In a hand tool of the class described, a cylindrical member having a rectangular socket in one end and a longitudinal slot extending transversely of the inner end of said socket; two tool-supporting jaws partially disposed within said socket; a pin for pivoting both jaws to said member; a threaded collar on said member and slidable lengthwise thereof; a pin in said collar extending through oppositely inclined slots in the inner ends of said jaws and said longitudinal slot; a handle to which said member is secured; and a revoluble nut coacting with said collar and adapted in its rotation to impart end movement thereto.

Signed at Boston, Mass., in the county of Suffolk and Commonwealth of Massachusetts, this 29th day of June, 1920.

WALTER E. LOMBARD.